(12) United States Patent
Nagda et al.

(10) Patent No.: US 9,703,303 B2
(45) Date of Patent: Jul. 11, 2017

(54) CHARGE PUMP LDO WITH SECONDARY SENSING FOR LOW POWER NEED BASED REFRESH

(71) Applicants: Miten H. Nagda, Austin, TX (US); Jose A. Camarena, Austin, TX (US); Dale J. McQuirk, Austin, TX (US)

(72) Inventors: Miten H. Nagda, Austin, TX (US); Jose A. Camarena, Austin, TX (US); Dale J. McQuirk, Austin, TX (US)

(73) Assignee: NXP USA, Inc., Austin, TX (US)

( * ) Notice: Subject to any disclaimer, the term of this patent is extended or adjusted under 35 U.S.C. 154(b) by 134 days.

(21) Appl. No.: 14/261,829

(22) Filed: Apr. 25, 2014

(65) Prior Publication Data

US 2015/0309518 A1  Oct. 29, 2015

(51) Int. Cl.
| | |
|---|---|
| *G05F 1/46* | (2006.01) |
| *H02M 3/07* | (2006.01) |
| *G05F 1/565* | (2006.01) |
| *H02M 3/156* | (2006.01) |

(52) U.S. Cl.
CPC ............... *G05F 1/468* (2013.01); *G05F 1/46* (2013.01); *G05F 1/462* (2013.01); *G05F 1/565* (2013.01); *H02M 3/07* (2013.01)

(58) Field of Classification Search
CPC ........................................................ G05F 1/46
USPC .................................................. 323/274, 271
See application file for complete search history.

(56) References Cited

U.S. PATENT DOCUMENTS

| | | | |
|---|---|---|---|
| 6,188,212 B1 | 2/2001 | Larson et al. | |
| 6,404,290 B1* | 6/2002 | Voo ......................... | H02M 3/07 323/284 |
| 7,550,954 B2 | 6/2009 | De Nisi et al. | |
| 7,808,324 B1 | 10/2010 | Woodford et al. | |
| 8,040,175 B2 | 10/2011 | Raghavan | |
| 2002/0070794 A1* | 6/2002 | Gariboldi .............. | H02M 3/073 327/540 |
| 2002/0153940 A1 | 10/2002 | Wurcer et al. | |
| 2005/0073355 A1* | 4/2005 | Sivero ..................... | H02M 3/07 327/536 |
| 2006/0181340 A1 | 8/2006 | Dhuyvetter | |
| 2009/0112555 A1* | 4/2009 | Boerstler .......... | G01R 31/31727 703/14 |
| 2010/0156518 A1* | 6/2010 | Hoque .................... | H02M 3/07 327/538 |
| 2012/0212077 A1* | 8/2012 | Lai ......................... | H02H 9/004 307/130 |
| 2012/0223691 A1* | 9/2012 | Weinstein ............... | H02M 1/44 323/283 |
| 2013/0241649 A1* | 9/2013 | Fort ........................ | G05F 1/575 330/253 |

(Continued)

*Primary Examiner* — Gary L Laxton
*Assistant Examiner* — Trinh Dang

(57) ABSTRACT

A voltage regulation system includes a voltage regulator configured to output a control signal indicating whether a voltage based on output of the voltage regulator is lower than a specified value. A charge pump is configured to output a voltage and a charging current. A pump monitor is configured to receive the control signal and the output voltage of the charge pump, and activate the charge pump when the control signal indicates the voltage based on output of the voltage regulator is lower than a specified value and the output voltage of the charge pump is lower than a threshold value.

20 Claims, 3 Drawing Sheets

(56) References Cited

U.S. PATENT DOCUMENTS

2014/0062443 A1\* 3/2014 Stanzione ........... H02M 3/1588
              323/284
2015/0109161 A1\* 4/2015 Trampitsch .......... H03K 17/063
              341/172

\* cited by examiner

US 9,703,303 B2

CHARGE PUMP LDO WITH SECONDARY SENSING FOR LOW POWER NEED BASED REFRESH

BACKGROUND

Field

This disclosure relates generally to charge pumps, and more specifically, to implementing an on-demand charge pump control loop for low power need-based refresh.

Related Art

It is generally desirable for microcontrollers to consume as little power as possible. To this end, a microcontroller implements one or more low power modes in which power used by the microcontroller is reduced. However, components of the microcontroller have operating requirements that present challenges when minimizing their power consumption during such low power modes.

BRIEF DESCRIPTION OF THE DRAWINGS

The present invention may be better understood, and its numerous objects, features, and advantages made apparent to those skilled in the art by referencing the accompanying drawings.

Figure 1:
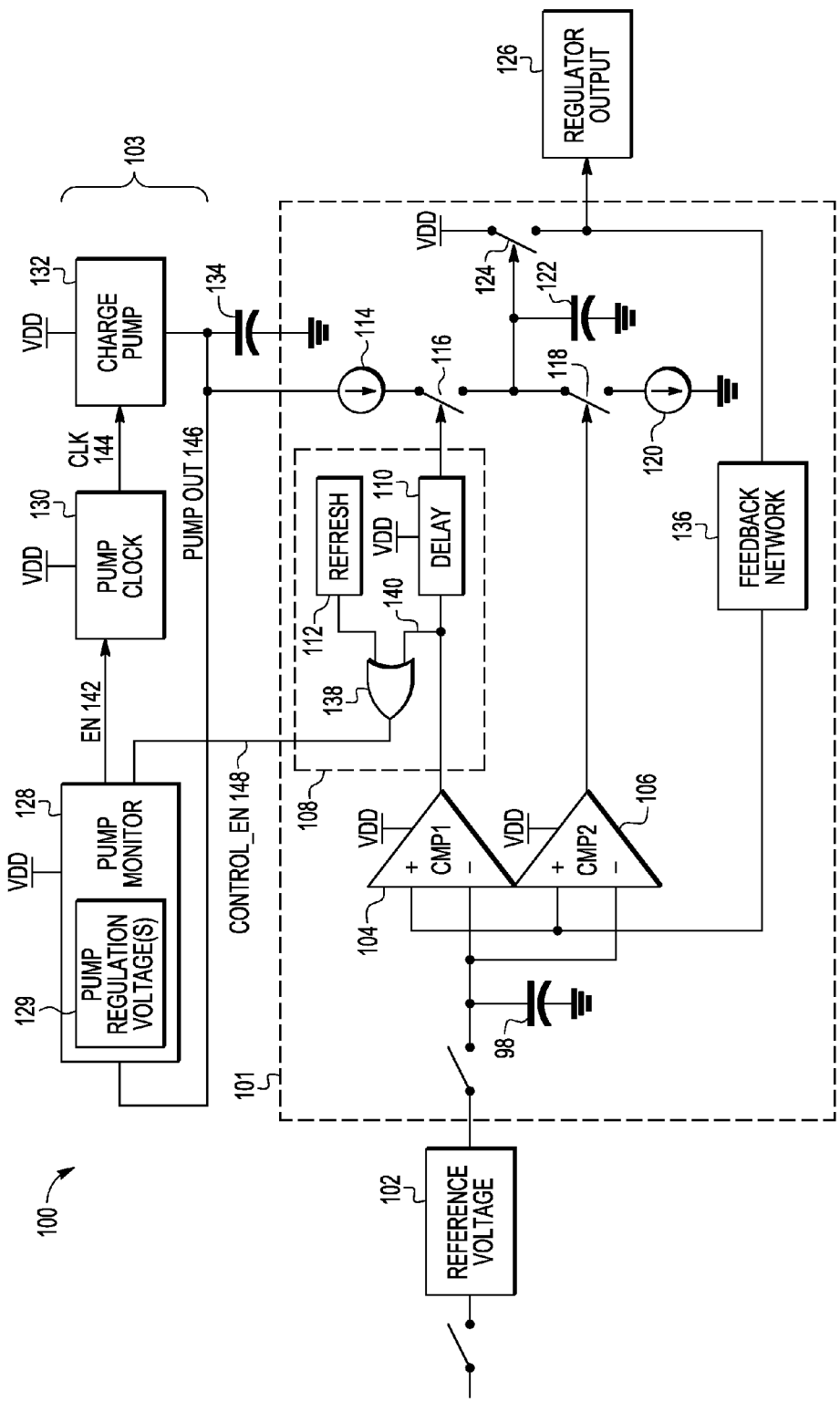
FIG. 1 illustrates a block diagram depicting an example voltage regulation system, according to some embodiments of the present disclosure.

The present invention is illustrated by way of example and is not limited by the accompanying figures, in which use of the same reference symbols indicates same elements unless otherwise noted. Elements in the figures are illustrated for simplicity and clarity and have not necessarily been drawn to scale.

DETAILED DESCRIPTION

The following sets forth a detailed description of various embodiments intended to be illustrative of the invention and should not be taken to be limiting.

Overview

Generally, a microcontroller is a small computer on an integrated circuit (IC) that is used in a variety of electronic devices. A microcontroller includes a number of integrated components, such as a central processing unit (CPU), flash memory, input/output ports, a clock generator, a power management controller (PMC), and the like. It is generally desirable to reduce the cost of producing microcontrollers, such as by reducing the die size on which the microcontroller is formed. However, improvements made to a microcontroller, such as increases in processing power or additional on-chip flash memory, often increase the footprint of the microcontroller. Additionally, as the footprint or the complexity (or both) of the microcontroller increases, a larger power management controller is often needed in order to manage the increased power consumption of the microcontroller. These factors in turn increase the microcontroller die size.

The microcontroller's PMC includes a voltage regulator that provides some operating voltage to the microcontroller, where the operating voltage (also referred to as the voltage regulator output) is provided at an output node of the voltage regulator. In one typical example of a PMC, the voltage regulator uses a natural (or native) n-channel transistor that is implemented as a pass gate having some minimal gate length. One example of gate length of a natural n-channel transistor is 0.8 microns. In an improved example of a PMC, the voltage regulator is improved to use a standard n-channel transistor having a minimal gate length that is generally two to three times smaller than a natural n-channel transistor. One example of gate length of a standard n-channel transistor is 0.38 microns. Such an improvement reduces the footprint of the PMC, thereby reducing the microcontroller die size.

In order to maintain a constant voltage regulator output at the output node, a control voltage is applied to the pass gate. Generally, the control voltage applied to the pass gate decays over time causing the voltage regulator output to decay as well. The control voltage of the pass gate needs to be greater than the voltage regulator output by the threshold voltage of the pass gate, where the control voltage needed may be greater than the available minimum supply voltage (also referred to as VDD). In one example, minimum supply voltage VDD is 1.71 volts, the voltage regulator output is 1.26 volts, and the pass gate threshold voltage is 0.7 volts. This requires a voltage of 1.96 volts (1.26 v+0.7 v) at the control gate of the pass gate device, which is greater than the available supply voltage VDD of 1.71 volts. One method to raise the voltage applied to the pass gate above VDD is to implement a charge pump. The charge pump also needs a monitoring control loop that monitors and regulates the charge pump output in order to avoid over-voltage conditions. While the addition of the charge pump and monitoring control loop increases the microcontroller die size, it is a reasonable compromise that still achieves a smaller die size as compared with the above-mentioned typical example of a PMC.

It is also desirable for microcontrollers to consume as little power as possible. To this end, a microcontroller's PMC implements one or more low power modes in which power used by the microcontroller is reduced. However, the power cost of the charge pump and monitoring control loop is quite significant in low power modes.

Embodiments of systems and methods disclosed herein provide a voltage regulation system that minimizes the power cost of regulating the charge pump output in a low power mode. Rather than monitoring and regulating the charge pump output at all times, the charge pump and monitoring control loop are activated on-demand when the voltage regulator needs to correct the voltage regulator output due to the voltage regulator output falling too low (also referred to as detecting the voltage regulator output requires up-regulation), and are otherwise deactivated. In this manner, the monitoring and regulation of the charge pump is minimized in a low power mode, providing an on-demand charge pump monitoring control loop.

The on-demand charge pump monitoring control loop is activated in response to receiving a control enable signal (or more simply a control signal) that is based on an output signal of a comparator of the voltage regulator. During microcontroller operation, the voltage regulator monitors the voltage regulator output. In response to a comparator of the voltage regulator detecting that the voltage regulator output requires up-regulation, a control enable circuit asserts a control enable signal that activates the pump monitor. The pump monitor monitors the charge pump output while the pump monitor is activated. If the pump monitor determines that the charge pump output is low (or falls below a threshold level), then the pump monitor enables a pump clock (e.g., by sending a clock enable signal) that provides a clock signal to the charge pump, which in turn enables the charge pump. The charge pump outputs a charge pump output voltage. Once the pump monitor determines that the charge pump output is no longer low (or exceeds the threshold level), the pump monitor disables the pump clock, which in turn disables the charge pump. The charge pump output voltage is used to raise the control voltage at the pass gate to a target control level, which in turn raises the voltage regulator output to a target output level. In response to the comparator detecting that the voltage regulator output no longer requires up-regulation, the control enable circuit clears the control enable signal, which deactivates the pump monitor. Deactivating the pump monitor in turn disables the pump clock (e.g., the clock enable signal is cleared), which in turn disables the charge pump. The charge pump is then allowed to collapse to and remain at VDD level until up-regulation is again required. Since the charge pump monitoring loop is only activated when needed (e.g., at the time of up-regulation of the voltage regulator output), the overall power penalty incurred by the charge pump and monitoring control loop is reduced. Operation of the on-demand charge pump monitoring control loop is further discussed in connection with FIG. 1.

Example Embodiments

FIG. 1 illustrates a block diagram depicting an example voltage regulation system 100, in accordance with certain embodiments of the present disclosure. Voltage regulation system 100 includes a voltage regulator 101 (or simply regulator 101), a reference voltage circuit 102, a charge pump and monitoring control loop circuit 103, and control enable circuit 108. Various components of voltage regulation system 100 are connected to a constant power supply voltage, referred to as VDD, which is monitored by a power management controller (not shown). In some embodiments, VDD is provided by a VDD bus. An example range of VDD voltages is 1.7 volts to 3.6 volts. The components of voltage regulation system 100 are further discussed below.

Voltage regulator 101, which is illustrated by dashed lines, includes capacitor 98, comparator 104, comparator 106, charging current source 114, switch 116, switch 118, discharging current source 120, capacitor 122, switch 124, regulator output node 126, and feedback network 136. Voltage regulator 101 is configured to monitor and adjust an output voltage of regulator output node 126, also referred to as regulator output voltage. To do so, comparators 104 and 106 are configured to adjust regulator output voltage to remain within a range or band of voltages by comparing the regulator output voltage (which can be provided by regulator output node 126 or by feedback network 136) with a reference voltage, as further discussed below.

Voltage regulator 101 is coupled to a reference voltage circuit 102. A constant reference voltage that is output by reference voltage circuit 102 is provided as input at terminals (e.g., at inverting (−) terminals) of comparators 104 and 106. In some embodiments, reference voltage circuit 102 outputs a bandgap reference voltage. Capacitor 98 is coupled between the output of reference voltage circuit 102 and ground, and smoothes out fluctuations in the reference voltage circuit output. In some embodiments, reference voltage circuit 102 is activated when needed, in order to save power (e.g., enabled periodically). Capacitor 98 also stores the reference voltage after reference voltage circuit 102 is deactivated and stops producing the reference voltage.

Regulator output voltage from regulator output node 126 is provided as input at terminals (e.g., at non-inverting (+) terminals) of comparators 104 and 106. In some embodiments, regulator output voltage is adjusted using feedback network 136 before being provided as input to terminals of comparators 104 and 106. Feedback network 136 may scale down or multiply the regulator output voltage (e.g., reduce or increase the regulator output voltage using some factor, such as 0.5×, 0.67×, 0.75×, 0.92×, 1×, 1.08×, 1.5×, 2×, 5×, etc.). In some embodiments, feedback network 136 is implemented as a divided network. In some embodiments, feedback network 136 provides a single (e.g., same) output to both comparator 104 and 106. In some embodiments, feedback network 136 provides two outputs (not shown), one output to comparator 104 and another output to comparator 106, where the two outputs provide two versions of regulator output voltage (e.g., two different values, such as a first adjusted value of regulator output voltage using one factor, and a second adjusted value of regulator output voltage using a different factor). Comparators 104 and 106 also receive supply voltage VDD.

Comparator 104 is configured to compare regulator output voltage (which can be provided by regulator output node 126 or by feedback network 136) with a specified floor voltage. In some embodiments, the specified floor voltage is the reference voltage provided to comparator 104 by reference voltage circuit 102. In other embodiments, the specified floor voltage is a biased version of the reference voltage produced by reference voltage circuit 102 (e.g., the reference voltage plus an offset voltage). Comparator 104 is configured to output an asserted logic signal (also referred to as an active logic signal) in response to detecting that the regulator output voltage is less than the specified floor voltage, which indicates that the regulator output voltage has fallen too low and needs up-regulation. As discussed herein, embodiments of an asserted or active logic signal include an active-high logic signal (e.g., "1") and an active-low logic signal (e.g., "0"). Comparator 104 is also configured to output a complementary cleared logic signal (also referred to as an inactive logic signal) when the regulator output voltage is greater than the specified floor voltage.

Comparator 106 is configured to compare regulator output voltage (which can be provided by regulator output node 126 or by feedback network 136) with a specified ceiling voltage. In some embodiments, the specified ceiling voltage is the reference voltage provided to comparator 104 by reference voltage circuit 102. In other embodiments, the specified ceiling voltage is a biased version of the reference voltage produced by reference voltage circuit 102 (e.g., the reference voltage plus an offset voltage). Comparator 106 is configured to output an active logic signal in response to detecting that the regulator output voltage is greater than the specified ceiling voltage, which indicates that the regulator output voltage is too high and needs down-regulation. Comparator 106 is also configured to output a complementary inactive logic signal when the regulator output voltage is less than the specified ceiling voltage.

Accordingly, in some embodiments, both comparators 104 and 106 receive the same regulator output voltage (either from regulator output node 126 or from feedback network 136), where comparator 104 is configured to use the reference voltage from reference voltage circuit 102 as the specified floor voltage, while comparator 106 is configured to use a biased version of the reference voltage (such as the reference voltage plus a positive offset voltage) as the specified ceiling voltage. In other embodiments, both comparators 104 and 106 receive the same regulator output voltage (either from regulator output node 126 or from feedback network 136), where comparator 106 is configured to use the reference voltage from reference voltage circuit 102 as the specified ceiling voltage, while comparator 104 is configured to use a biased version of the reference voltage (such as the reference voltage plus a negative offset voltage) as the specified floor voltage. In still other embodiments, comparators 104 and 106 receive different versions of regulator output voltage from feedback network 136 (e.g., two adjusted values of regulator output voltage), where comparator 104 is configured to use the reference voltage from reference voltage circuit 102 or a biased version of the reference voltage (or the reference voltage plus some positive or negative offset voltage) as the specified floor voltage, and comparator 106 is configured to use the same reference voltage or the same biased version (using the same offset voltage) of the reference voltage as the specified ceiling voltage.

Together, comparator 104 and 106 determine whether the regulator output voltage remains within a specified operating band of voltages, such as between the specified floor voltage and the specified ceiling voltage. For example, comparator 104 determines whether the regulator output voltage remains above 1.3 volts (or specified floor voltage), and comparator 106 determines whether the regulator output voltage remains below 1.4 volts (or specified ceiling voltage).

The output of comparator 106 is coupled to a control of switch 118. An input terminal of switch 118 is coupled to a control of switch 124, which implements a pass gate for voltage regulator 101. Capacitor 122 is also coupled between the control of switch 124 and ground, stores the control voltage, and smoothes out any fluctuations in the control voltage. An output terminal of switch 118 is coupled to an input terminal of discharging current source 120, which has an output terminal coupled to ground. Switch 124 has an input terminal coupled to VDD and an output terminal coupled to regulator output node 126. In some embodiments, switches 118 and 124 are implemented using n-channel transistors or other suitable devices.

When the regulator output voltage is determined to be too high by comparator 106, comparator 106 outputs an active logic signal that controls switch 118 to close the connection in order to reduce the control voltage applied at switch 124. The control of switch 124 is now coupled to ground via the closed connection of switch 118, which reduces the control voltage of switch 124, which in turn decreases regulator output voltage at regulator output node 126. This is also referred to as down-regulating the regulator output voltage. Comparator 106 continues to monitor regulator output voltage during this time. Once regulator output voltage is no longer determined to be too high (e.g., the regulator output voltage falls under the specified ceiling voltage), comparator 106 outputs an inactive logic signal that controls switch 118 to open the connection and stop reducing the control voltage applied at the control of switch 124.

The output of comparator 104 is coupled to a control of switch 116 via control enable circuit 108, which is further discussed below. An output terminal of switch 116 is coupled to a control of switch 124. Since VDD is not adequate to raise the control voltage of switch 124, an input terminal of switch 116 is instead coupled to an output of charge pump 132 (also referred to as charge pump output node 146) via a charging current source 114. In some embodiments, switch 116 is implemented using a suitable type of transistor, such as a p-channel transistor.

When the regulator output voltage is determined to be too low by comparator 104, comparator 104 outputs an active logic signal that controls switch 116 to close the connection in order to increase the control voltage applied at switch 124. The control of switch 124 is now coupled to charge pump output node 146 via the closed connection of switch 116, which increases the control voltage of switch 124, which in turn increases regulator output voltage at regulator output node 126. This is also referred to as up-regulating the regulator voltage output. Comparator 104 continues to monitor regulator output voltage during this time. Once regulator output voltage is no longer determined to be too low (e.g., the regulator output voltage exceeds the specified floor voltage), comparator 104 outputs an inactive logic signal that controls switch 116 to open the connection and stop increasing the control voltage applied at the control of switch 124. Switch 116 is also referred to as a low voltage correction switch.

Charge pump and monitoring control loop circuit 103 includes pump monitor 128, pump clock 130, charge pump 132, and capacitor 134. Pump monitor 128 is activated in response to receiving control enable signal 148 that is an active logic signal (also referred to as an active control enable signal 148 or an asserted control enable signal 148), and is deactivated in response to receiving control enable signal 148 that is an inactive logic signal (also referred to as an inactive control enable signal 148 or a cleared control enable signal 148). Pump monitor 128 is coupled to pump clock 130, where pump clock 130 is activated in response to receiving enable signal 142 that is an active logic signal (also referred to as an active enable signal 142 or an asserted enable signal 142), and is deactivated in response to receiving enable signal 142 that is an inactive logic signal (also referred to as an inactive enable signal 142 or a cleared enable signal 142). Pump clock 130 is coupled to charge pump 132, where charge pump 132 is triggered to produce a target pump output voltage and charging current when charge pump 132 receives a clock signal 144 from pump clock 130. Pump monitor 128 is also coupled to pump output node 146 to receive the output voltage of charge pump 132 for monitoring purposes, as further discussed below. Capacitor 134 couples the charge pump's output to ground, and smoothes out fluctuations in the charge pump output. When charge pump 132 does not receive a clock signal 144, charge pump 132 stops producing the target pump output voltage. Capacitor 134 also stores the charge pump output voltage after charge pump stops producing the target pump output voltage. Pump monitor 128, pump clock 130, and charge pump 132 also receive VDD.

Pump monitor 128 is activated when regulator output voltage requires up-regulation (e.g., when regulator output voltage falls below a specified floor voltage) and is otherwise deactivated (e.g., when regulator output voltage exceeds the specified floor voltage). When activated, pump monitor 128 is configured to monitor the output voltage of charge pump 132, as well as adjust the pump output voltage when needed. In one embodiment, pump monitor 128 monitors the pump output voltage and adjusts the pump output voltage to remain within a band of voltages, such as between a pump ceiling voltage and a pump floor voltage (also referred to as pump regulation voltage(s) 129). In such an embodiment, pump monitor 128 up-regulates the pump output voltage to remain above the pump floor voltage and down-regulates the pump output voltage to remain below the pump ceiling voltage (which also avoids over-charging conditions in the system).

However, in low-power mode implementations, pump monitor 128 does not continuously regulate the pump output voltage. Rather than use ceiling and floor voltages, pump monitor 128 uses a threshold pump output level to (minimally) regulate the pump output voltage when needed. For example, once activated, pump monitor 128 monitors the pump output voltage. In response to detecting that pump output voltage falls below a threshold pump output level (and thus requires up-regulation), pump monitor 128 enables pump clock 130 by sending an active enable signal 142 to pump clock 130. In turn, pump clock 130 begins sending clock signal 144 to charge pump 132, where charge pump 132 in turn produces an output voltage. Pump monitor 128 (while activated) continues to monitor the pump output voltage, and once the pump output voltage exceeds the threshold pump output level (also referred to as pump regulation voltage(s) 129), pump monitor 128 disables pump clock 130 by clearing enable signal 142 (or sends an inactive enable signal 142). In turn, pump clock 130 stops sending clock signal 144 to charge pump 132, where charge pump 132 in turn stops producing the output voltage. Once charge pump 132 stops producing the output voltage, the output voltage is stored on capacitor 134.

The pump output voltage is used to raise the control voltage on the voltage regulator's pass gate, which in turn raises (or up-regulates) the regulator output voltage. Once the regulator output voltage no longer requires up-regulation, the pump monitor is deactivated and no longer monitors the charge pump. When pump monitor 128 is deactivated, pump monitor 128 clears enable signal 142 to pump clock 130, which disables pump clock 130. In response, pump clock 130 stops sending clock signal 144 to charge pump 132, which disables charge pump 132, which in turn stops producing output voltage. The pump output voltage stored on capacitor 134 is allowed to collapse (or slowly decay) to VDD and remain there until the regulator output voltage again requires up-regulation (which requires a voltage greater than VDD to raise the control voltage at the pass gate). At such a time, pump monitor 128 is again activated and begins monitoring the pump output voltage. Pump monitor 128 enables pump clock 130, which in turn enables charge pump 132, in response to detecting that the pump output voltage requires up-regulation (e.g., the pump output voltage has fallen below a threshold level, which is required to up-regulate the regulator output voltage), as described above.

Control enable circuit 108, which is illustrated by dashed lines, is configured to output a control enable signal 148 based on an output of comparator 104. Control enable circuit 108 receives the output of comparator 104, also referred to as input signal 140. Control enable signal 148 is received by pump monitor 128. In some embodiments, control enable circuit 108 provides the output of comparator 104 (or signal 140) as the control enable signal 148 (not shown). In such embodiments, control enable signal 148 is an active logic signal (also referred to as an active control enable signal 148) when signal 140 is an active logic signal (e.g., when comparator 104 determines that the regulator output voltage falls below a specified floor voltage), which activates pump monitor 128 and initiates up-regulation of the regulator output voltage, as further described below. In such embodiments, control enable signal 148 is an inactive logic signal (also referred to as an inactive control enable signal 148) when signal 140 is an inactive logic signal (e.g., comparator 104 determines that the regulator output voltage does not fall below a specified floor voltage). Accordingly, charge pump and monitoring control loop circuit 103 is activated on an on-demand basis as directed by control enable signal 148.

In some embodiments, control enable circuit 108 includes additional logic components, such as OR gate 138 and temperature/time-based refresh circuit 112. A non-limiting example of such embodiments is illustrated in FIG. 1. The input signal 140 and an output of refresh circuit 112 are inputs of OR gate 138, which outputs control enable signal 148. Refresh circuit 112 is configured to output an active logic signal in response to detection of either a time-based condition or a temperature-based condition, or both. For example, a time-based condition can be defined as a recurring specified period of time, where refresh circuit 112 is triggered to output an active logic signal in response to detecting that the specified period of time has elapsed. Accordingly, refresh circuit 112 is triggered at regular intervals to activate charge pump and monitoring control loop circuit 103, which refreshes (or up-regulates) the charge pump output.

Also for example, a temperature-based condition can be defined as one or more specified threshold temperatures. Each threshold temperature is associated with a different recurring specified period of time (or time-based condition). As the specified threshold temperatures increase, the associated specified period of time decreases. Refresh circuit 112 is triggered to output an active logic signal in response to detecting that the microcontroller's operating temperature has exceeded a particular threshold temperature and that the specified period of time associated with the particular threshold temperature has elapsed. Accordingly, for a range of operating temperatures (e.g., a range between two adjacent threshold temperatures), refresh circuit 112 is triggered at regular intervals to activate charge pump and monitoring control loop circuit 103. As the operating temperature of the microcontroller increases and exceeds successive threshold temperatures, the recurring specified period of time decreases, which triggers refresh circuit 112 to output an active logic signal more often to compensate for higher leakage at higher temperatures.

Otherwise, refresh circuit 112 outputs an inactive logic signal. Thus, OR gate 138 outputs an active logic signal in response to either input signal 140 or output of refresh circuit 112, or both, being an active logic signal. Since refresh circuit 112 tends to increase the number of times the charge pump and monitoring control loop circuit 103 is activated, the inclusion of refresh circuit 112 (and OR gate 138) in circuit 108 may incur a larger power cost as compared to using input signal 140 as control enable signal 148, and thus may not result in a charge pump implementation with the lowest power consumption.

Control enable circuit 108 also includes delay circuit 110. The output of comparator 104 is also coupled to an input terminal of delay circuit 110, and an output terminal of delay circuit 110 is coupled to the control of switch 116. Delay circuit 110 also receives VDD. In order to save power, charge pump and monitoring control loop circuit 103 is configured to be activated in response to an active control enable signal 148 and remains deactivated otherwise. In order to provide a pump output voltage at the input terminal of switch 116, charge pump and monitoring control loop circuit 103 needs time for activation before the pump output voltage is available at the input terminal of switch 116 when the regulator output voltage needs to be up-regulated. To do this, delay circuit 110 is configured to delay the propagation of comparator 104's output to the control of switch 116 until a time that pump output voltage is output by charge pump 132. The propagation delay produced by delay circuit 110 should be long enough to cover the time needed for pump monitor 128 to become active and to trigger an active enable signal 142 to pump clock 130, for pump clock 130 to transmit a clock signal 144 to charge pump 132, and for charge pump 130 to output a charge pump voltage and current in response to the received clock signal 144. At the end of the delay, charge pump 132 outputs a charge pump voltage that is available to increase the control voltage on switch 124 when switch 116 is controlled by comparator 104 to close the connection.

Figure 2:
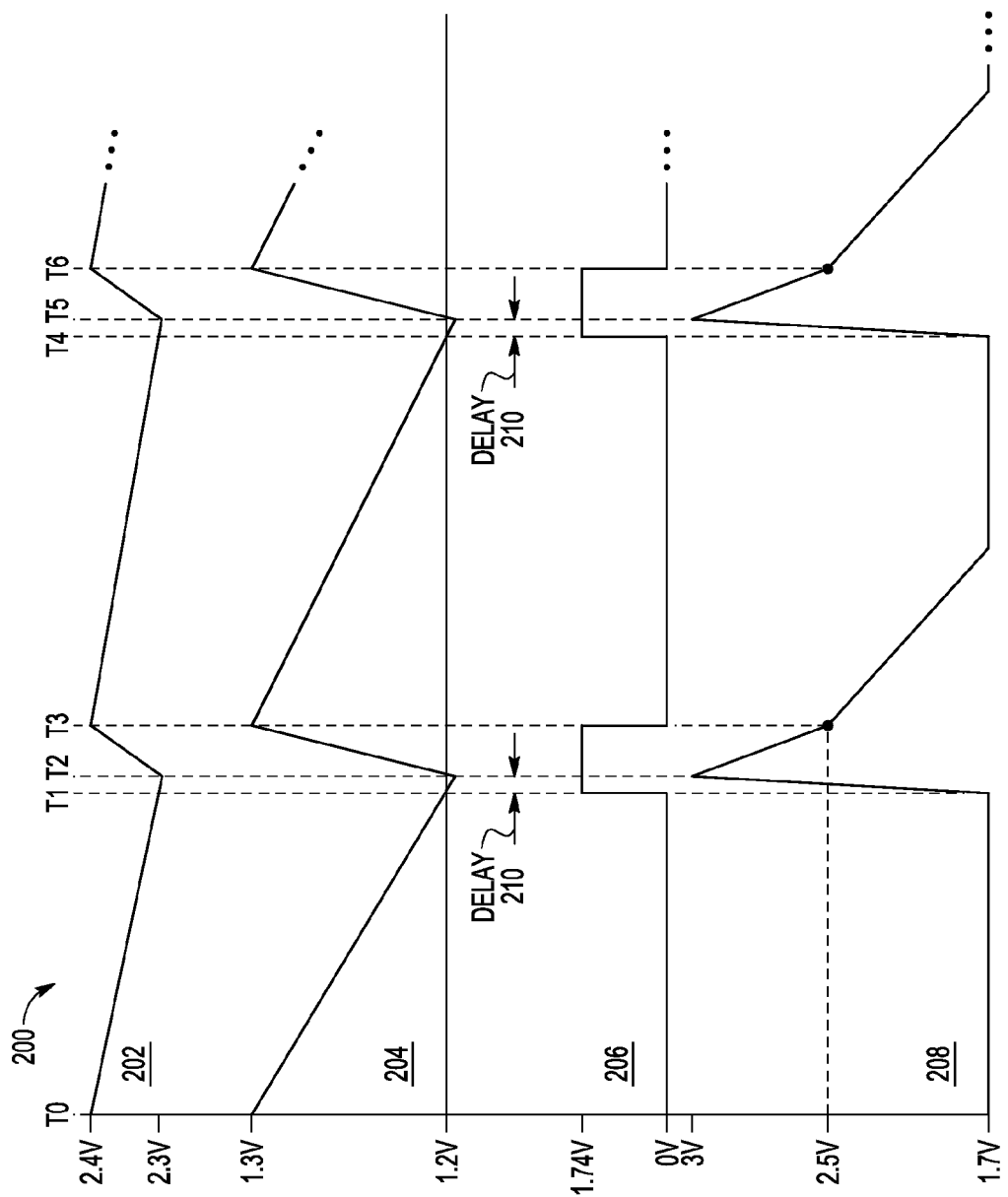
FIGS. 2 and 3 illustrate diagrams depicting example waveforms at a plurality of nodes within a voltage regulation system, according to some embodiments of the present disclosure.

FIG. 2 illustrates a diagram depicting example waveforms at a plurality of nodes within a voltage regulation system, in accordance with certain embodiments of the present disclosure. Waveform 202 illustrates control voltage of pass gate 124 over time (also referred to as pass gate control voltage 202), waveform 204 illustrates regulator output voltage at regulator output node 126 over time (also referred to as regulator output voltage 204), waveform 206 illustrates control enable signal 148 over time (also referred to as control enable signal 206), and waveform 208 illustrates the voltage at charge pump output node 146 over time (also referred to as charge pump output voltage 208).

At an initial time T0, pass gate control voltage 202 is at a target control level of 2.4 volts, regulator output voltage 204 is at a target output level of 1.3 volts, control enable signal 206 is cleared, and charge pump output is at VDD level of 1.7V. Pass gate control voltage 202 decreases over time, which in turn decreases regulator output voltage 204. Once regulator output voltage 204 reaches a specified floor voltage at time T1, which is illustrated in this example as 1.2 volts, comparator 104 detects that regulator output voltage requires up-regulation and outputs an active logic signal. In response, control enable circuit asserts control enable signal 206. In response to the asserted control enable signal 206, pump monitor 128 is activated and monitors pump output voltage. In response to detecting that pump output voltage is below a threshold level (such as a level of 2.5V, 2.9V, or 3V), pump monitor 128 enables charge pump 132 to output a target pump output voltage (which may be greater than the threshold level). There is a small delay 210 that occurs from time T1 to time T2 while charge pump 132 is activated and begins to output the pump output voltage at time T2 (e.g., ramps up to the target pump output voltage). During the delay 210, the pass gate control voltage continues to fall, which also causes the regulator output voltage 204 to continue to drop past the 1.2 volt floor. Once pump output voltage exceeds the threshold level (such as reaching 3V) at time T2, pump monitor 128 disables charge pump 132 to stop outputting the target pump output voltage.

In response to the available charge pump output 208 at time T2, pass gate control voltage 202 begins to increase over time, which also causes a corresponding increase in regulator output voltage 204 over time. Charge pump output 208 also decreases between time T2 and time T3 as charge is transferred from charge pump output 208 to pass gate control voltage 202. Control enable signal 206 remains asserted while comparator 104 continues to detect that regulator output voltage 204 is too low. At time T3, regulator output voltage 204 reaches the target output level. In response, control enable circuit clears control enable signal 206. Charge pump output 208 is allowed to collapse to VDD level after T3 until a next time that regulator output voltage 204 requires up-regulation, such as at time T4.

Figure 3:
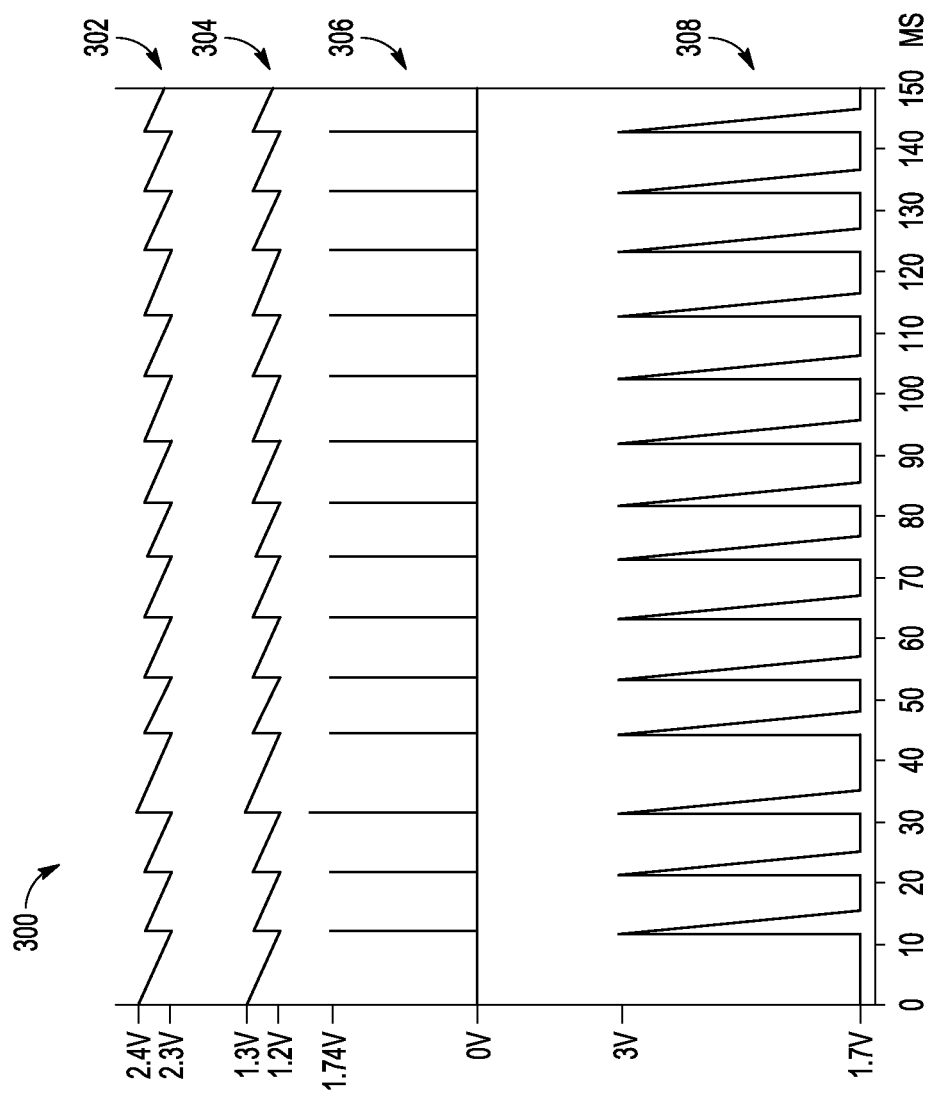

FIG. 3 illustrates a diagram depicting example waveforms at a plurality of nodes within a voltage regulation system, in accordance with certain embodiments of the present disclosure. Waveform 302 illustrates control voltage of pass gate 124 over time (also referred to as pass gate control voltage 302), waveform 304 illustrates regulator output voltage at regulator output node 126 over time (also referred to as regulator output voltage 304), waveform 306 illustrates control enable signal 148 over time (also referred to as control enable signal 306), and waveform 308 illustrates voltage at charge pump output node 146 over time (also referred to as charge pump output voltage 308).

The waveforms illustrate that the regulator output voltage is up-regulated periodically, which occurs at a faster scale at a higher operating temperature. For example, at a lower operating temperature, the regulator output voltage is up-regulated on the order of seconds (e.g., 1 second), while at a higher operating temperature, the regulator output voltage is up-regulated on the order of milliseconds (e.g., 10 ms) or microseconds (e.g., 100 μs).

By now it should be appreciated that there has been provided embodiments of systems and methods that disclose a voltage regulation system that minimizes the power cost of regulating charge pump output. The present disclosure provides an embodiment of a voltage regulation system that includes a voltage regulator configured to output a control signal indicating whether a voltage based on output of the voltage regulator is lower than a specified value. The voltage regulation system also includes a charge pump configured to output a voltage and a charging current. The voltage regulation system also includes a pump monitor configured to receive the control signal and the output voltage of the charge pump, and activate the charge pump when the control signal indicates the voltage based on output of the voltage regulator is lower than a specified value and the output voltage of the charge pump is lower than a threshold value.

One aspect of the above embodiment further provides that the voltage regulation system further includes a pump clock configured to receive an enable signal from the pump monitor, and provide a clock signal to activate the charge pump when the enable signal is asserted.

Another aspect of the above embodiment further provides that the voltage regulation system further includes a first comparator having an input coupled to the voltage based on output of the voltage regulator and an output that provides an enable signal indicating whether the voltage based on output of the voltage regulator is lower than a specified value. The voltage regulation system also further includes a logic gate having a first input coupled to the output of the first comparator, a second input coupled to a refresh signal, and an output that provides the control signal based on whether the output of the first comparator indicates the voltage based on output of the voltage regulator is lower than a specified value or the refresh signal is asserted.

A further aspect provides that the refresh signal is used to enable the pump monitor based on temperature or elapsed time. Another further aspect provides that the voltage regulation system further includes a refresh module configured to provide the refresh signal.

Another aspect of the above embodiment further provides that the voltage regulation system further includes a low voltage correction switch; and a delay circuit coupled between the output of the first comparator and a control input of the low voltage correction switch, a first electrode of the low voltage correction switch is coupled to a charging current source from the charge pump, and a second electrode of the low voltage correction switch is coupled to a first electrode of an high voltage correction switch.

A further aspect provides that the voltage regulation system further includes a second comparator including a first input coupled the voltage based on output of the regulator, a second input coupled to a reference voltage, and an output coupled to a control electrode of the high voltage correction switch. The voltage regulation system further includes a second electrode of the high voltage correction switch is coupled to a current source.

Another further aspect provides that the voltage regulation system further includes a first comparator having a first input coupled to the voltage based on output of the voltage regulator, a second input coupled to a reference voltage, and an output that provides an enable signal indicating whether the voltage based on output of the voltage regulator is lower than a specified value. The voltage regulation system further includes a regulator output gate including a first electrode coupled to a supply voltage, a second electrode coupled to the first input of the first and second comparators, and a control electrode coupled between the second electrode of the low voltage correction switch and the first electrode of the high voltage correction switch.

Another further aspect provides that the voltage regulation system further includes a capacitor having a first terminal coupled to the control electrode of the regulator output gate and a second terminal coupled to ground.

Another aspect of the above embodiment further provides that the voltage regulation system further includes a capacitor having a first terminal coupled to the output voltage of the charge pump and a second terminal coupled to ground, the voltage output of the charge pump is tapped at the first terminal of the capacitor.

Another aspect of the above embodiment further provides that the voltage regulation system further includes a first comparator having a first input coupled to the voltage based on output of the voltage regulator, a second input coupled to a reference voltage, and an output that provides an enable signal indicating whether the voltage based on output of the voltage regulator is lower than a specified value. The voltage regulation system further includes a second comparator including a first input coupled the voltage output of the regulator, a second input coupled to the reference voltage, and an output coupled to a control electrode of a high voltage correction switch. The voltage regulation system further includes a capacitor having a first terminal coupled to the second inputs of the first and second comparators, and a second terminal coupled to ground.

The present disclosure also provides an embodiment of a method for regulating voltage, which includes comparing a voltage output of a voltage regulator to a reference voltage and providing a signal indicating whether the voltage based on output of the voltage regulator is lower than the reference voltage. The method further includes, if the voltage based on output of the voltage regulator is lower than the reference voltage, operating a pump monitor to enable a clock to provide a clock signal to a charge pump when an output voltage of the charge pump is lower than a threshold value, the charge pump being coupled to provide charge current to raise the voltage based on output of the voltage regulator.

One aspect of the above method embodiment further provides that the comparing a voltage output of a voltage regulator to a reference voltage is performed using a first comparator.

Another aspect of the above method embodiment further provides that the method further includes enabling the clock and the pump monitor based on one of a group consisting of: a refresh signal and the signal indicating whether the voltage based on output of the voltage regulator is lower than the reference voltage.

A further aspect provides that a pump monitor receives the refresh signal or the signal indicating whether the voltage based on output of the voltage regulator is lower than the reference voltage, and provides an enable signal to the clock.

The present disclosure also provides another embodiment of a voltage regulation system that includes a voltage regulator that includes a first comparator configured to compare an output voltage of the voltage regulator to a reference voltage and provide a signal indicating the voltage based on output of the voltage regulator is lower than a specified value. The voltage regulation system also includes a charge pump monitor coupled to receive the signal indicating the voltage based on output of the voltage regulator is lower than a specified value. The voltage regulation system also includes a charge pump operated by the charge pump monitor to provide a charging current to the voltage regulator when the voltage based on output of the voltage regulator is lower than the specified value.

One aspect of the above embodiment further provides that a voltage output of the charge pump is coupled to an input of the pump monitor.

Another aspect of the above embodiment further provides that the voltage regulation system further includes a switch having a first terminal coupled to the charge current, and a second terminal coupled to a control electrode of an output gate of the voltage regulator, the switch is controlled by the signal indicating the voltage based on output of the voltage regulator is lower than the reference voltage.

Another aspect of the above embodiment further provides that the voltage regulation system further includes a second comparator configured to compare the output voltage of the voltage regulator to the reference voltage and provide a signal indicating the voltage based on output of the voltage regulator is higher than the reference voltage.

A further aspect provides that the voltage regulation system further includes an N-channel transistor having a drain electrode coupled to a control electrode of an output gate of the voltage regulator, a source electrode coupled to ground and a control electrode coupled to the signal from the second comparator.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

For purposes of discussion, the I/O circuit of the present disclosure is illustrated in the context of a microcontroller system. However, the I/O circuit can be similarly employed in various types of electronic devices, such as application specific integrated circuits (ASICs), microprocessors, systems-on-a-chip (SOCs), and the like.

The terms "assert" or "set" or "active" and "deassert" or "negate" or "clear" or "inactive" are used herein when referring to the rendering of a signal, status bit, or similar apparatus into its logically true or complementary logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterisk (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Also for example, in one embodiment, the illustrated elements of system 100 are circuitry located on a single integrated circuit or within a same device. Alternatively, system 100 may include any number of separate integrated circuits or separate devices interconnected with each other. For example, reference voltage circuit 102 may be located on a same integrated circuit as voltage regulator 101 or on a separate integrated circuit discretely separate from other elements of system 100.

Although the invention has been described with respect to specific conductivity types or polarity of potentials, skilled artisans appreciated that conductivity types and polarities of potentials may be reversed.

Although the invention is described herein with reference to specific embodiments, various modifications and changes can be made without departing from the scope of the present invention as set forth in the claims below. For example, switches 118 and 124 may be implemented by transistors of different conductivity types, such as p-channel transistors rather than n-channel transistors. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A voltage regulation system comprising:
   a voltage regulator comprising:
      a first comparator configured to output an activated control signal when a voltage based on output of the voltage regulator is lower than a specified value,
      a regulator output switch that provides the output of the voltage regulator,
      a low voltage correction switch having a control input coupled to an output of the first comparator,
      an enable circuit coupled to the output of the first comparator, the enable circuit configured to output an activated enable signal based on the activated control signal output by the first comparator, and
      a delay circuit coupled between the output of the first comparator and the control input of the low voltage correction switch;
   a charge pump configured to output a voltage and a charging current, wherein the charging current is provided to a first electrode of the low voltage correction switch, and a second electrode of the low voltage correction switch is coupled to a control input of the regulator output switch; and
   a pump monitor coupled to the output of the enable circuit, the pump monitor is enabled in response to receipt of the activated enable signal and is disabled otherwise, the pump monitor is further coupled to an output voltage of the charge pump, and the pump monitor, when enabled, is configured to:
      activate the charge pump in response to a determination that the output voltage of the charge pump is lower than a threshold value;
   wherein the enable circuit comprises a logic gate having a first input coupled to the output of the first comparator, a second input coupled to a refresh signal, and an output that provides the activated enable signal when either the activated control signal is output by the first comparator or the refresh signal is asserted, wherein the refresh signal is used to enable the pump monitor based on temperature or elapsed time.

2. The voltage regulation system of claim 1, further comprising:
   a pump clock configured to
      receive an enable signal from the pump monitor, and
      provide a clock signal to activate the charge pump when the enable signal is asserted.

3. The voltage regulation system of claim 1, wherein the first comparator has a first input coupled to the voltage based on the output of the voltage regulator, a second input coupled to a reference voltage, and an output that provides the activated control signal when the voltage based on the output of the voltage regulator is lower than a specified value indicated by the reference voltage.

4. The voltage regulation system of claim 1, further comprising:
   a high voltage correction switch, wherein
      the second electrode of the low voltage correction switch is further coupled to a first electrode of the high voltage correction switch.

5. The voltage regulation system of claim 1, further comprising:
   a capacitor having a first terminal coupled to the output voltage of the charge pump and a second terminal coupled to ground, the output voltage of the charge pump is tapped at the first terminal of the capacitor.

6. The voltage regulation system of claim 4, further comprising:
   a second comparator including a first input coupled to the voltage based on the output of the regulator, a second input coupled to a reference voltage, and an output coupled to a control electrode of the high voltage correction switch, wherein the output of the second comparator indicates whether the voltage based on the output of the voltage regulator is higher than a specified value; and a second electrode of the high voltage correction switch is coupled to ground via a discharging current source.

7. The voltage regulation system of claim 4, wherein the regulator output switch includes a first electrode coupled to a supply voltage, a second electrode coupled to the first input of each of the first and second comparators, and the control input further coupled between the second electrode of the low voltage correction switch and the first electrode of the high voltage correction switch, wherein a voltage at the control input of the regulator output switch is used to adjust the output of the voltage regulator.

8. The voltage regulation system of claim 6, further comprising:
a capacitor having a first terminal coupled to the second inputs of each of the first and second comparators, and a second terminal coupled to ground.

9. The voltage regulation system of claim 7, further comprising:
a capacitor having a first terminal coupled to the control electrode of the regulator output switch and a second terminal coupled to ground.

10. A method of regulating voltage, comprising:
comparing, performed by a first comparator, a voltage based on output of a voltage regulator to a reference voltage and providing an activated enable signal indicating that the voltage based on the output of the voltage regulator is lower than the reference voltage;
in response to the activated enable signal indicating that the voltage based on the output of the voltage regulator is lower than the reference voltage, enabling a pump monitor that is coupled to a charge pump;
determining, by the pump monitor when enabled, that an output voltage of the charge pump is lower than a threshold value;
in response to the determining, enabling a clock coupled to the charge pump to provide charging current to raise the voltage based on the output of the voltage regulator, wherein
the charging current is provided to a first electrode of a low voltage correction switch of the voltage regulator, and
the enabling the clock and the pump monitor is based on one or more of a group consisting of: a refresh signal and the activated enable signal indicating whether the voltage based on output of the voltage regulator is lower than the reference voltage;
providing an activated control signal to a control electrode of the low voltage correction switch based on the activated enable signal, wherein a second electrode of the low voltage correction switch is coupled to a control electrode of a regulator output switch that provides the output of the voltage regulator;
comparing, performed by a second comparator, the voltage based on the output of the voltage regulator to the reference voltage and providing a control signal indicating whether the voltage based on the output of the voltage regulator is higher than the reference voltage; and
providing the control signal to a control electrode of a high voltage correction switch, wherein a first electrode of the high voltage correction switch is coupled to the control electrode of the regulator output switch, and a second electrode of the high voltage correction switch is coupled to ground via a discharging current source.

11. The method of claim 10, wherein an output of the first comparator is coupled to the control electrode of the low voltage correction switch and an output of the second comparator is coupled to the control electrode of the high voltage correction switch.

12. The method of claim 10, wherein the pump monitor receives the refresh signal or the activated enable signal indicating whether the voltage based on output of the voltage regulator is lower than the reference voltage, and provides an enable signal to the clock.

13. A voltage regulation system, comprising:
a voltage regulator including:
a first comparator configured to compare a voltage based on output of the voltage regulator to a reference voltage and to output a first activated control signal when the voltage based on the output of the voltage regulator is lower than a specified value indicated by the reference voltage,
a regulator output switch that provides the output of the voltage regulator,
a low voltage correction switch having a control input, a first electrode, and a second electrode,
a delay circuit coupled between an output of the first comparator and the control input of the low voltage correction switch,
a second comparator configured to compare the voltage based on the output of the voltage regulator to the reference voltage and to output a second activated control signal when the voltage based on the output of the voltage regulator is higher than the reference voltage, and
a high voltage correction switch having a control input coupled to the output of the second comparator, a first electrode coupled to the second electrode of the low voltage correction switch, and a second electrode coupled to ground via a discharging current source;
a charge pump monitor further coupled to the output of the first comparator, the charge pump monitor is enabled in response to receipt of the activated control signal and is disabled otherwise; and
a charge pump operated by the charge pump monitor to provide a charging current to the first electrode of the low voltage correction switch of the voltage regulator, wherein the second electrode of the low voltage correction switch is coupled to a control input of the regulator output switch, the charge pump monitor is further coupled to an output voltage of the charge pump, and
the charge pump monitor, when enabled, is configured to:
activate the charge pump in response to a determination that the output voltage of the charge pump is lower than a threshold value.

14. The voltage regulation system of claim 13, wherein the low voltage correction switch is controlled by the first activated control signal indicating the voltage based on the output of the voltage regulator is lower than the reference voltage.

15. The voltage regulation system of claim 13, wherein the high voltage correction switch is implemented using an N-channel transistor having a drain electrode further coupled to a control gate of the regulator output switch of the voltage regulator, a source electrode coupled to ground via the discharging current source, and a control electrode coupled to the signal from the second comparator.

16. The voltage regulation system of claim 13, wherein the high voltage correction switch is controlled by the second activated control signal output by the second comparator indicating the voltage based on the output of the voltage regulator is higher than the reference voltage.

17. The voltage regulation system of claim 13, wherein the regulator output switch includes a first electrode coupled to a supply voltage, a second electrode coupled to the first input of each of the first and second comparators, and the control input further coupled between the second electrode of the low voltage correction switch and the first electrode of the high voltage correction switch, wherein a voltage at the control input of the regulator output switch is used to adjust the output of the voltage regulator.

18. The voltage regulation system of claim 13, further comprising:
a capacitor having a first terminal coupled to the output voltage of the charge pump and a second terminal coupled to ground, the output voltage of the charge pump is tapped at the first terminal of the capacitor.

19. The voltage regulation system of claim 13, further comprising:
a capacitor having a first terminal coupled to reference voltage inputs of each of the first and second comparators, and a second terminal coupled to ground.

20. The voltage regulation system of claim 17, further comprising:
a capacitor having a first terminal coupled to the control input of the regulator output switch and a second terminal coupled to ground.

* * * * *